July 17, 1951     H. A. SCHIESSL     2,561,142
SASH CONSTRUCTION
Filed Nov. 1, 1946     2 Sheets-Sheet 2
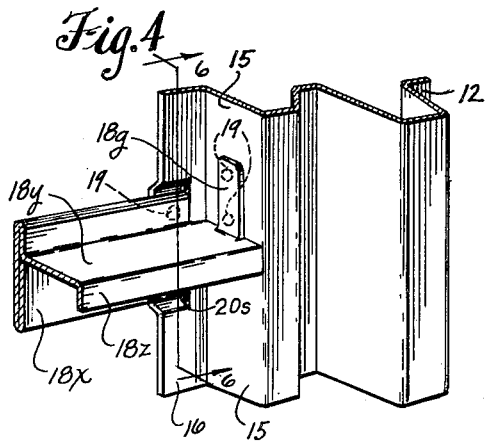
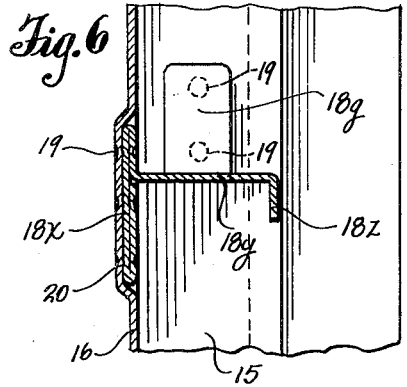
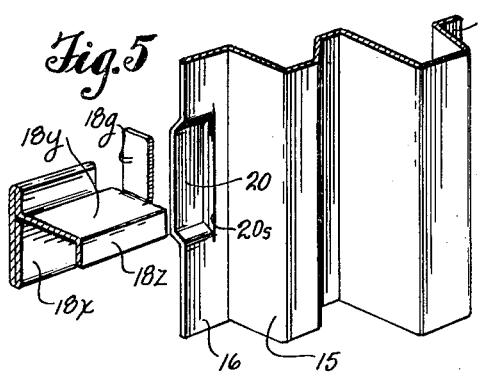
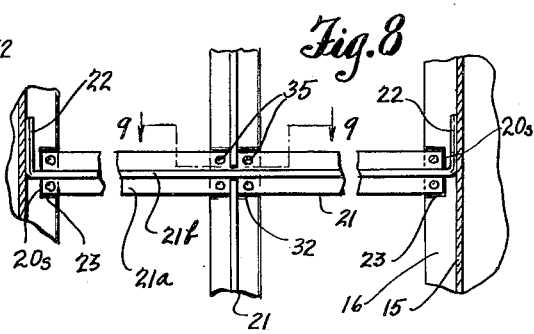
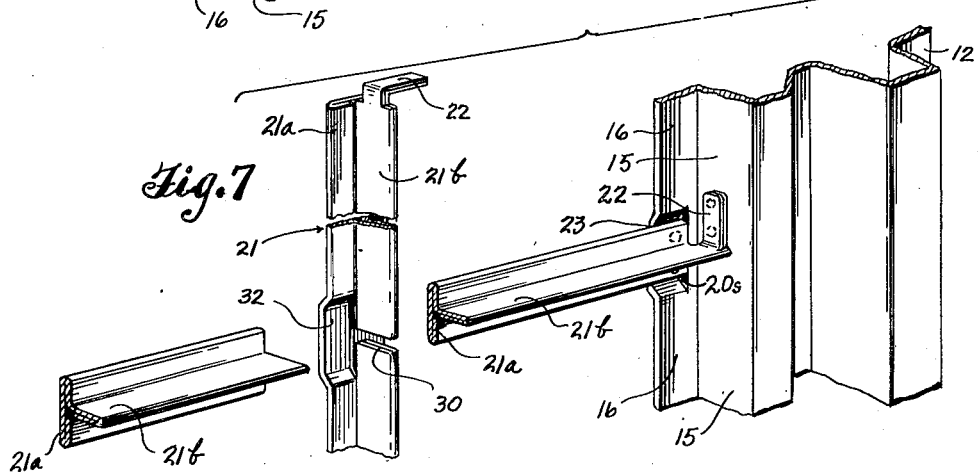
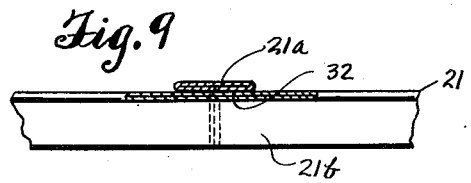
INVENTOR
HERBERT A. SCHIESSL
BY
Cook & Robinson
ATTORNEYS Patented July 17, 1951

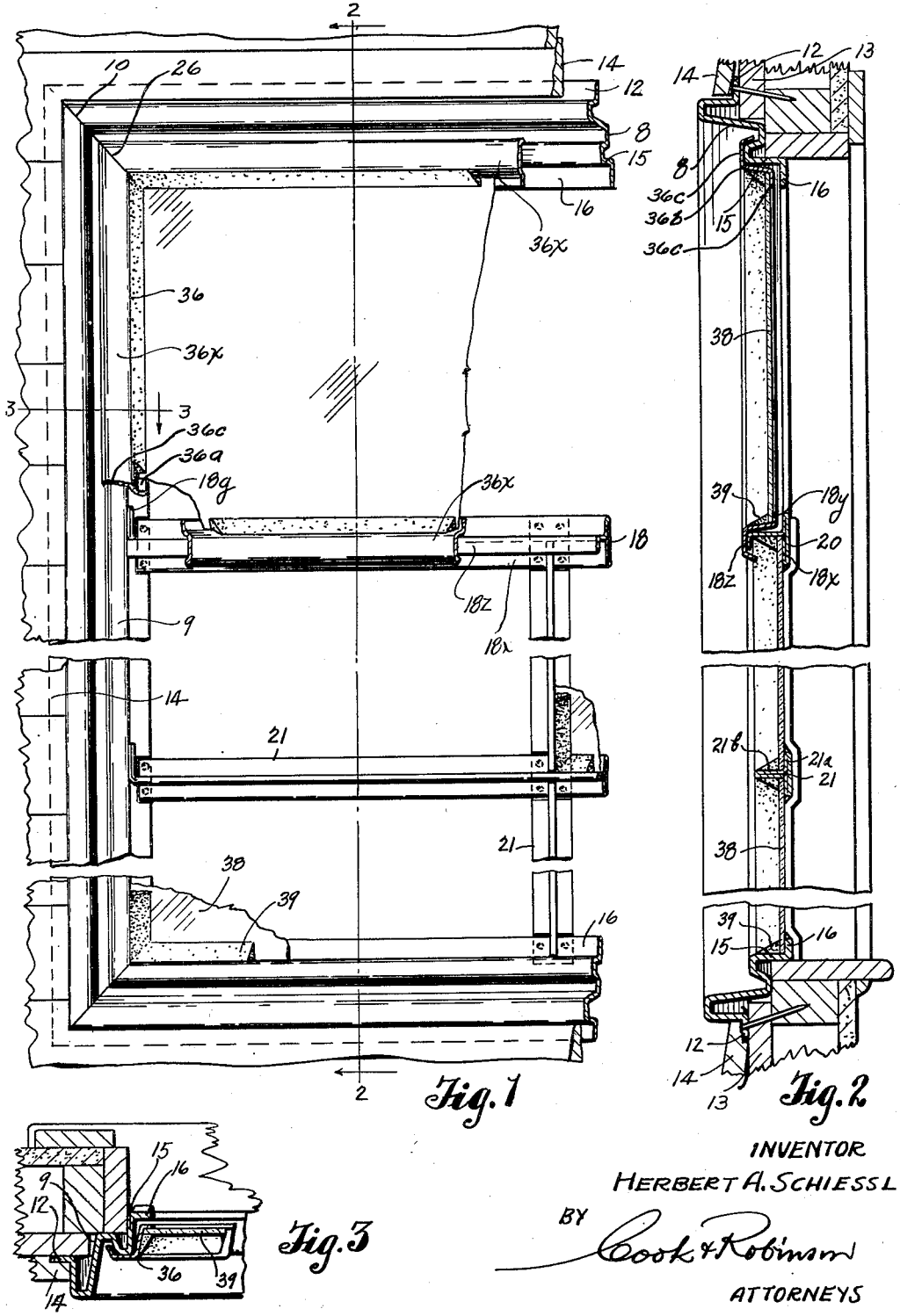

2,561,142

UNITED STATES PATENT OFFICE 2,561,142

SASH CONSTRUCTION

Herbert A. Schiessl, Seattle, Wash.

Application November 1, 1946, Serial No. 707,118

4 Claims. (Cl. 189—76)

This invention relates to window construction, and it has to do with improvements in metal window frames and metal sash that are fabricated from metal strips, that are preformed, cut, fitted and spot welded together to form the size and kind of frame or sash desired; the present invention being applicable to window frame and sash constructions of that kind shown and described in my copending application filed on April 29, 1944, under Serial No. 533,290, now U. S. Patent No. 2,440,918, but not necessarily limited thereto.

It is the principal object of this invention to provide novel features of design, pertaining to the assembly and joining together of the frame and division bars, whereby a more secure and more rigid connection of these parts is effected, particularly where the ends of division bars are secured to the frame members and where vertical and horizontal division bars are crossed and joined.

It is also an object of this invention to so shape and join the parts that all flanges provided about panel openings that are designed to be glazed will be flush, thus to better seat the glass panels and make glazing easier and more satisfactory.

More specifically stated, the present invention resides in the details of construction of metal window frames, sashes and division bars, and in the manner of assembling and joining of beams, rails or bars making up these parts, to provide rigid, secure and long lasting constructions in a practical and economical way.

Other objects and advantages of the invention are to be found in the details of construction of parts; in their interfitted connections and manner of securement, as hereinafter described.

In accomplishing these and other objects of the invention, I have provided the improved details of construction, the preferred forms of which are illustrated in the accompanying drawings, wherein—

Fig. 1 is a broken section of the front or outside elevation of a portion of a window, showing frame members and division bars constructed and joined in accordance with the improvements of the present invention.

Fig. 2 is a section taken in a vertical plane on line 2—2 in Fig. 1.

Fig. 3 is a section taken in the horizontal plane of the line 3—3 in Fig. 1.

Fig. 4 is a perspective view showing portions of a frame member and of division bars, and illustrating the novel details of construction and manner of joining the division bar to the frame members.

Fig. 5 is a similar view, showing the parts as prepared for and prior to their being joined together.

Fig. 6 is a section taken on line 6—6 in Fig. 4.

Fig. 7 is a perspective view illustrating the joining of muntin bars to the frame and manner of crossing and securing muntin bars.

Fig. 8 is a front view of parts shown in Fig. 7.

Fig. 9 is a cross-section on line 9—9 in Fig. 8.

Referring more in detail to the drawings:

In Fig. 1, I have shown portions of a typical window frame and sash in which the novel features of the present invention have been embodied. In this view, 8 designates the horizontal top member of the window frame and 9 designates a vertical side member; these members having ends thereof beveled and joined permanently together by a welded seam, designated at 10.

It will be understood by reference to the cross-sectional view of these parts, seen in Figs. 1 and 2, that they are alike in size and shape and each comprises a continuous metal strip which, by reason of its special design or shape, forms the window trim molding as well as a frame member. The particular features of the construction, in this respect, have been set forth in detail in my previously mentioned copending application.

Without going into unnecessary detail in describing those members which constitute the main frame, it is believed sufficient to say that, as here shown, each has a flat outturned flange 12 along its outer edge that is adapted to engage flatly against and to be secured to a wall sheathing such as indicated at 13 in Fig. 2, and to be overlaid by the ends of wall siding material such as designated at 14, or by brick when used in brick veneered buildings. In some instances, for example, when such frames are to be used in concrete structures, the flange 12 may be eliminated or modified to suit the construction.

Along their inside edges, the frame members 8 and 9, and likewise the corresponding opposite side and end members, not herein shown, are formed with inturned jamb forming portions 15, which are perpendicular to the plane of the window frame and which at their inner edges have laterally turned base flanges 16, serving as glazing bases. It is to be understood that these parts, 15 and 16, extend entirely about the rectangular frame opening and all lie in the same vertical plane.

It is common that frames of the above described kind be equipped with division bars to define the various panels for glazing or for receiving hinged sash or doors for ventilating purposes, and it is mainly in the provision of novel means for joining and securing the division bars to the frame members that the invention resides.

In the provision of vent openings in such frames, a division bar, referred to generally as a meeting bar is used, such a bar being designated in Fig. 1 by reference numeral 18. It is shown in the various views as being formed from a single strip of metal, bent upon itself to form a relatively wide base flange 18x, and a forwardly directed web 18y which, at its outer edge is formed with a downturned flange 18z. It is shown best in Fig. 5, that the horizontal web 18y extends slightly beyond the end edges of the base flange 18x and at each of its ends has a tongue 18g turned at a right angle thereto; this description being directed to the parts and shown best in Figs. 4 and 5.

Preparatory to applying the meeting bar 18 and to securing it in the window frame, the inner edge flanges 16 of opposite frame members are formed at proper locations with flat, inwardly struck seats such as shown at 20 in Fig. 5, each designed to receive the end portion of the meeting bar therein, as shown in Fig. 4. In forming the seat 20 it is provided with a straight, abrupt shoulder 20S defining its inner edge. This shoulder is spaced slightly from and is parallel with the adjacent wall portion 15 of the frame. These seats are of such depth that when the end portions of the base flange 18x of the meeting bars are seated therein, the forward or outer surfaces of the flanges will be flush with the outer surface of the flanges 16 thus to eliminate any offset in bearing surfaces against which panes of glass are to be disposed and held by the putty.

It is to be understood, further, that when a bar 18 has been applied across a frame, and its end portions properly disposed in the seats or depressions 20 provided therefor, the end edges of the base flange 18x will be engaged tightly against the inner edge defining shoulder 18S of the seat and the end edge of the forwardly extending flange 18y and the tongues 18g will flatly engage against the jamb walls 15 of the frame members as has been illustrated in Fig. 4. Then they are rigidly secured by spot welding the tongues to the walls 15 and end portions of the base flange to the base portion of seats 20 in the flange 16 by spot welding. In Fig. 4 the location of the welded spots are designated at 19. By so joining the ends of the division or meeting bar to the frame members, a rigid and secure connection will be made and flush surfaces either for the glass panes or for seating sash frames are provided about the panel openings.

Where no ventilation is to be provided through the window structure, the meeting bars 18 might be eliminated and the frame divided into panels for glazing by use of what are referred to as "muntin bars" and which are of the kind shown in Figs. 7 and 8; these bars being designated by reference numeral 21. Muntin bars are substantially like the meeting bars and are secured within the frame in the same manner.

As best shown in Figs. 7, 8 and 9, each muntin bar is made from a single strip of metal, preferably sheet steel, bent and folded upon itself to provide a rigid bar, T-shape in cross section, and comprising a base flange 21a and a longitudinal web or flange 21b along its longitudinal center. The web extends at its ends slightly beyond the end edges of the base flange 21a and is equipped with laterally turned tongues 22. Likewise, the jamb 15 of the frame members is equipped, as in Figs. 7 and 8 with depressions or seats 23 designed to receive the end portions of the base flange therein and the parts, after being so assembled are joined by spot welding the tongues to the frame members 15 and the flange 21b to the base wall of the seats 23 in the same manner as described in connection with the joining of the meeting bars to the frame.

To provide for the crossing and joining of muntin bars 21 without necessitating the offsetting of those flanges used for seating of the glass panes, the bars that extend in one direction, here shown to be the vertical bars, will have their web portions formed with slots 30 shaped to closely receive the horizontal bars therethrough. Also, the base flanges of the vertical bars will be offset outwardly at locations in registration with the inner ends of the slots 30 to provide seats 32 against which the base flanges of the horizontal bars, in passing through the slots 30 will be received, thus bringing the base flanges of the vertical and horizontal bars into the same plane. The crossed parts are joined by spot welding as at 35 in Fig. 8.

Where a hinged or removable sash is to be applied to a panel of the frame that has been formed by the application of a meeting bar thereto, such sash are applied as will be understood best by reference to Figs. 1 and 2, wherein the sash frame is designated by numeral 36. The sash is there shown to comprise enclosing frame members 36x, all of the same cross sectional form, and also cut and joined at the four corners by a diagonal joint as at 26 in Fig. 1. Each frame member 36x comprises a wall portion 36a that is perpendicular to the plane of the sash and formed about its inner edge with an inturned flange 36b and about its outer edge with an outturned flange 36c. The flanges 36b are flush and provide the supporting means for the glass panes 38, held by putty, shown at 39, in the usual manner. In the closed position of the sash, its flanges 36b will engage tightly against the flush flanges of the frame members and meeting bar as shown in Fig. 2.

Frames so constructed are rigid and durable, and provide for glazing without difficulty. Furthermore, the construction is applicable to the securing of meeting bars, muntin bars and the secure joining of crossed members.

Having thus described my invention, what I claim as new therein and desire to secure by Letters Patent is:

1. In a window structure, a frame member having a jamb portion with a flange turned at an angle therefrom, said flange being formed with an inset seat having an abrupt, inner edge defining shoulder spaced from the jamb portion and parallel thereto, a division bar comprising a longitudinal base flange and a longitudinal web, said base flange having an end portion engaged flatly against said seat and fixed thereto with its end portion abutted against said edge defining shoulder of the seat, and said web extending beyond said end portion of the base flange and abutting the jamb portion and fixed to the said jamb.

2. In a window structure a sheet metal frame member having a jamb portion and a flange extending inwardly at a right angle thereto and having an inwardly struck seat formed with an inner edge defining shoulder spaced from the jamb portion of the frame and parallel thereto, a metal division bar comprising a longitudinal base flange with a longitudinal web extending forwardly therefrom, said base flange of the division bar having one end portion thereof disposed flatly against said seat and welded thereto with its end abutting against the said edge defining shoulder of the seat, the web extending beyond the end of the base flange and being abutted against the jamb portion of the frame member and having a tongue turned laterally therefrom and welded to said jamb portion, the said seat being of a depth equal to the thickness of the base flange of the division bar.

3. A window structure comprising a frame therefor, the frame having a jamb portion and a flange extending inwardly at right angles to the jamb portion, the flange having a plurality of inwardly struck seats formed at spaced intervals therein, each seat terminating in an abrupt straight shoulder spaced inwardly of the jamb portion and parallel thereto, a metal division bar of substantially T-shape extending across the window opening and comprising a longitudinal base flange and a longitudinal web extending forwardly therefrom, the base flange having an end portion disposed flatly against each of the seats with the end of the base flange abutting the shoulder, the end of the web extending beyond the end of the base flange and being abutted against the jamb portion, a tongue on the end of the web and bent at right angles thereto, the tongue and end of the web flatly engaging against the jamb portion, and the base of the division bar being substantially the same thickness as the depth of the seat whereby all surfaces will be substantially even and level.

4. The structure as defined in claim 3 wherein the longitudinal web has a longitudinally extending coextensive down-turned flange at right angles thereto to cooperate with and aid in sealing a ventilating opening in the window structure.

HERBERT A. SCHIESSL.

REFERENCES CITED

The following references are of record in the file of this patent:

UNITED STATES PATENTS

| Number | Name | Date |
| --- | --- | --- |
| 916,115 | Davis | Mar. 23, 1909 |
| 1,305,746 | Rush | June 3, 1919 |
| 1,714,188 | Plym | May 21, 1929 |
| 2,351,127 | Hodson | June 13, 1944 |